United States Patent

[11] 3,579,093

[72] Inventors Paul R. Johannessen
Lexington;
Thorleif Knutrud, Sudbury, Mass.

[21] Appl. No. 872,312
[22] Filed Oct. 29, 1969
[45] Patented May 18, 1971
[73] Assignee Sylvania Electric Products Inc.

[54] VARIABLE MUTUAL COUPLING CIRCUIT EMPLOYING TRANSFORMERS IN AN INDUCTIVE BALANCED CONFIGURATION
7 Claims, 4 Drawing Figs.

[52] U.S. Cl. .......... 323/50, 307/252B, 307/252T, 323/62
[51] Int. Cl. .......... H03k 17/18
[50] Field of Search .......... 307/252 (R, B, G, H, K, L, M, N, T, W), 284, 305, 239, 240, 241, 242; 321/68, 70; 323/6, 49, 50, 57, 58, 60, 61, 62, 86; 328/152, 170, 261

[56] References Cited
UNITED STATES PATENTS

| | | | |
|---|---|---|---|
| 3,089,961 | 5/1963 | Overn | 323/86X |
| 3,196,329 | 7/1965 | Cook | 307/252TX |
| 3,414,878 | 12/1968 | Smith | 307/252BX |
| 3,428,882 | 2/1969 | Gilbert | 323/50X |
| 3,486,042 | 12/1969 | Watrous | 307/252BX |

*Primary Examiner*—John S. Heyman
*Assistant Examiner*—L. N. Anagnos
*Attorneys*—Norman J. O'Malley, Elmer J. Nealon and Robert T. Orner

ABSTRACT: A variable mutual coupling circuit employing a plurality of transformers connected in an inductive balanced configuration between an input circuit and an output circuit. Bipolar switches associated with the transformers are activated in a predetermined sequence to unbalance the inductance and thereby transfer energy from the input circuit to the output circuit.

INVENTORS
PAUL R. JOHANNESSEN
THORLEIF KNUTRUD
BY Robert T. Omee
ATTORNEY

INVENTORS
PAUL R. JOHANNESSEN
THORLEIF KNUTRUD
BY Robert T. Omer
ATTORNEY

VARIABLE MUTUAL COUPLING CIRCUIT EMPLOYING TRANSFORMERS IN AN INDUCTIVE BALANCED CONFIGURATION

BACKGROUND OF THE INVENTION

This invention relates to mutual coupling circuits and in particular to circuits for varying in discrete steps the mutual coupling between a source and an output circuit.

Described in copending application Ser. No. 770,292, assigned to the assignee of the present application, is a high power pulse generating system employing an alternating current storage device, such as a high-Q inductance and capacitance circuit. The storage device is connected to a load, such as a radio frequency antenna through a variable mutual coupling network. A control circuit, also connected to the variable mutual coupling network, supplies a control signal that varies with time. In response to the control signal, the mutual coupling between the storage device and the antenna is varied to allow the energy stored in the storage device to be unilaterally transferred to the antenna. By varying the mutual coupling with time during the energy transfer, it is possible to shape the envelope of the transferred energy and thereby shape the radio frequency (RF) pulse envelope.

The rate at which the mutual coupling between the storage device and the antenna is changed determines the rise time of the RF pulse radiated by the antenna. To obtain accurate measurements, it is desirable to change the mutual coupling in a time which is short compared to the period of the RF oscillation. It is, therefore, an object of this invention to provide an improved mutual coupling network which improves the rise time and phase control of the RF pulse radiated by the antenna.

BRIEF SUMMARY OF THE INVENTION

A variable mutual coupling circuit according to the present invention employs first and second transformers having primary and secondary windings connected in an inductive balanced configuration between an alternating current source and an output circuit. A means for electrically bypassing, such as a bipolar switch, is connected across one of the transformer windings, for example, the secondary winding of the first transformer. In response to a control signal, the bipolar switch is closed short circuiting the secondary winding. A discrete change in the mutual inductance of the transformer results, causing an inductive unbalance to occur. Energy is then transferred between the energy source and the output circuit.

A second bipolar switch placed across one of the windings, for example, the secondary winding of the second transformer, is closed a predetermined time after the first bipolar switch closure. The energy transfer is inhibited, thereby producing a pulse of alternating current energy in the output circuit. To minimize detuning of the energy source and output circuits when the inductance unbalance occurs, compensation networks are employed in one embodiment.

BRIEF DESCRIPTION OF THE DRAWINGS

The construction and operation of the apparatus according to the invention will be more fully understood from the following detailed description taken in conjunction with the accompanying drawings in which.

DETAILED DESCRIPTION OF THE INVENTION

Figure 1:
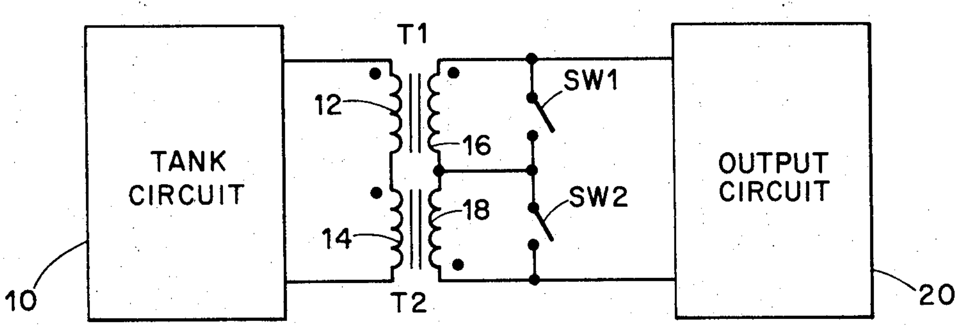
FIG. 1 is a diagrammatic representation of one embodiment of a variable mutual coupling circuit according to the present invention.

A circuit for varying mutual coupling between an alternating current energy source 10 and an output circuit 20 according to the present invention is illustrated in the diagram of FIG. 1. An alternating current energy source, such as a tank circuit 10, operable to store RF energy is connected to a pair of series connected transformers $T_1$ and $T_2$. The primary windings 12 and 14 of respective transformers $T_1$ and $T_2$ have substantially equal values of inductance and are connected in a series aiding arrangement while the secondary windings 16 and 18, also having substantially equal values of inductance, are connected in a series opposing arrangement. A first switch SW1 is connected across the secondary winding 16 of transformer $T_1$ and similarly a second switch SW2 is connected across the secondary winding 18 of transformer $T_2$. Connected to the secondary windings 16 and 18 of transformer $T_2$ is an output circuit 20 such as a tuned antenna circuit.

Assuming that RF energy is supplied to the tank circuit 10 from an RF power network source (not shown) and that the switches SW1 and SW2 are in the open position, then the two transformers $T_1$ and $T_2$ couple equal and opposite voltages between the tank circuit 10 and the output circuit 20 resulting in a mutual coupling value of zero. Each circuit is therefore coupled to the self-inductance $L_a$ of the transformers and separated from each other if the two transformers $T_1$ and $T_2$ are matched. When the switch SW1 is closed, short circuiting the secondary winding 16 of transformer $T_1$, transformer $T_2$ couples the tank circuit 10 to the output circuit 20. At a predetermined time later, the second switch SW2 is closed, short circuiting the secondary winding 18 of the second transformer $T_2$, thereby inhibiting the transfer of energy between the tank circuit 10 and the output circuit 20. Phase reversal of the RF pulse in the output circuit 20 results if the order in which switches SW1 and SW2 are closed is reversed.

When a switch is closed in the circuit of FIG. 1, the self-inductance of the transformers is removed from the tank and output circuits 10 and 20, respectively, which results in a change of the resonant frequency of the two circuits. An embodiment of a circuit according to the present invention which minimizes the detuning of a tank circuit 30 and the output circuit 32 is shown in schematic form in FIG. 2 and includes a tank circuit 30 such as a series connected inductor $L_T$ and a capacitor $C_T$. Connected in parallel with the tank circuit are two series connected bipolar switches 38 and 39, each switch including a pair of parallel connected controlled rectifiers, for example, silicon controlled rectifiers. The parallel controlled rectifiers of each pair are connected in an opposite polarity arrangement to form a bipolar switch.

Connected in parallel with the tank circuit 30 is a series combination of a compensation network, for example, a first capacitor $C_1$, the primary winding 40 of a first transformer $T_3$, the primary winding 42 of a second transformer $T_4$ and a second compensating capacitor $C_2$. The primary windings 40 and 42 of the first and second transformers $T_3$ and $T_4$ are connected in a series aiding arrangement. Connected in parallel with the series combination of the first capacitor $C_1$ and the primary winding 40 is the first bipolar switch 38, and similarly, the bipolar switch 39 is connected in parallel with the series combination of the second capacitor $C_2$ and the primary winding 42 of the transformer $T_4$.

The respective secondary windings 44 and 46 of transformers $T_3$ and $T_4$ are connected in a series opposing arrangement and in series with third and fourth compensating capacitors $C_3$ and $C_4$. A third bipolar switch 48 is connected in parallel with the series combination of the third capacitor $C_3$ and the secondary winding 44 of the transformer $T_3$, and similarly, a fourth bipolar switch 50 is connected in parallel with the series combination of the fourth capacitor $C_4$ and the secondary winding 46 of the transformer $T_4$. The output circuit 32 is connected in parallel with the series connected third and fourth bipolar switches 48 and 50.

The four bipolar switches 38, 39, 48 and 50 include respective pairs of parallel connected controlled rectifiers CR1 and CR2, CR5 and CR6, CR3 and CR4, and CR7 and CR8. The rectifiers of each pair are connected in an opposite polarity arrangement to form a bipolar switch. A pair of control transformers $T_a$ and $T_b$ have their primary windings 33 and 34 connected to respective trigger signal sources 35 and 36 and their secondary windings connected to the bipolar switches. The controlled rectifiers of bipolar switches 38 and 48 have their gate and cathode elements associated with the secondary windings coupled to the primary winding 33 of transformer $T_a$, and likewise, the controlled rectifiers of bipolar switches 39 and 50 have their gate and cathode elements associated with the secondary windings coupled to the primary winding 34 of the fourth transformer $T_b$.

Figure 2:
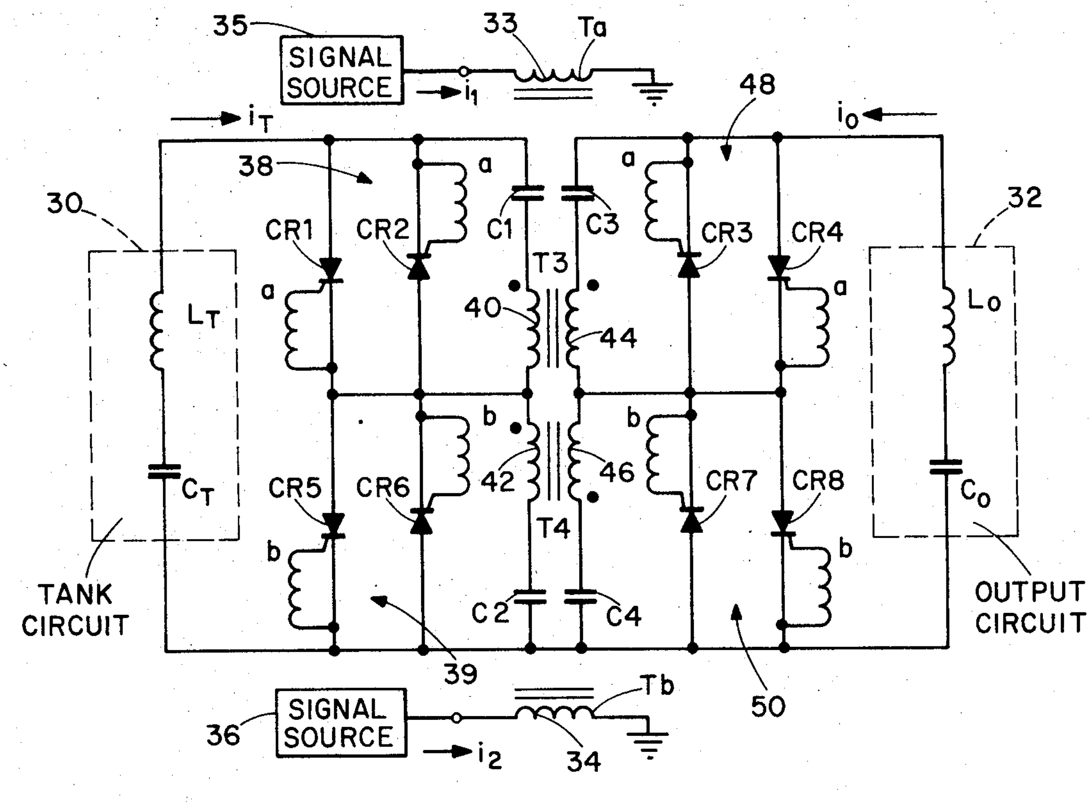
FIG. 2 is a schematic representation of a second embodiment of a variable mutual coupling circuit according to the present invention.
Figure 3:
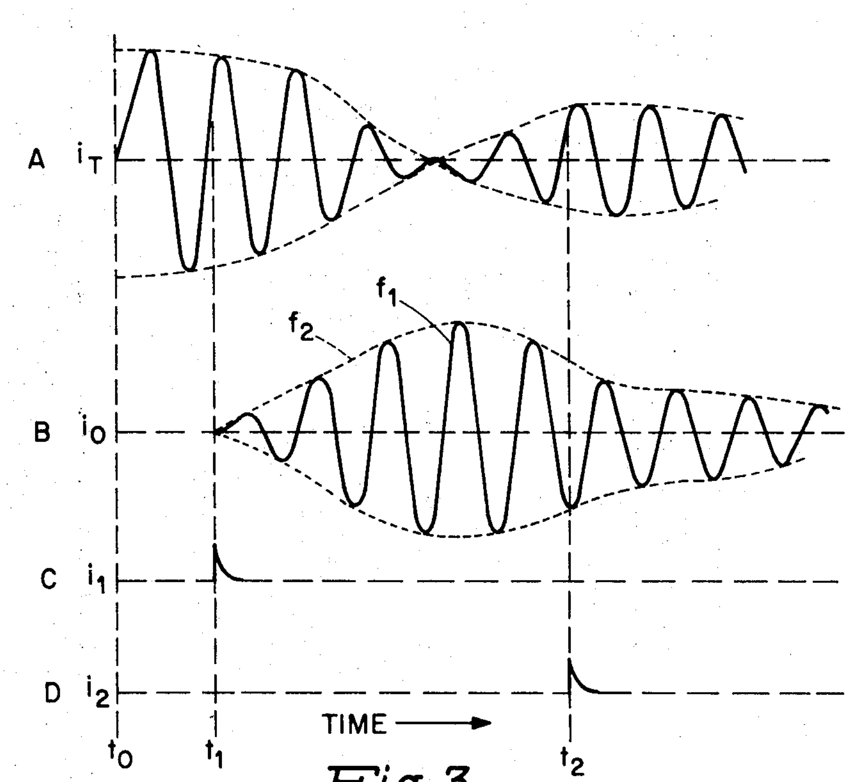
FIG. 3 is a series of waveforms useful in explaining the operation of the embodiment of FIG. 2.

The waveforms of FIG. 3 are useful in explaining the operation of the embodiment of the variable mutual coupling circuit of FIG. 2. Assuming that at time $t_o$ the tank circuit 30 is oscillating at its resonant frequency as shown in the waveform A of FIG. 3 and that all bipolar switches are open, then a current $i_T$ flows from the tank circuit to the series combination of the first capacitor $C_1$, the respective primary windings 40 and 42 of the first and second transformers $T_3$ and $T_4$ and the second capacitor $C_2$. Energy is coupled to the secondary windings 44 and 46, however, since they are connected in a series opposing arrangement, no output current $i_o$ flows in the output circuit 20 as indicated in waveform B of FIG. 3.

At a time $t_1$, a signal current pulse $i_1$ (see waveform C of FIG. 3) is directed through the primary winding of the third transformer $T_a$ from any well-known trigger signal source 35 to trigger controlled rectifiers CR1, CR2, CR3 and CR4 and thereby close the first and third bipolar switches 38 and 48. The bipolar switches 38 and 48 effectively short circuit the first transformer $T_3$ causing an inductive unbalance. Energy is then transferred from the tank circuit 30 to output circuit 32 as represented by the flow of output current $i_o$ in the waveform B of FIG. 3. The mutually coupled circuits exchange energy of frequency $f_1$ in a sinusoidal way with a frequency of exchange $f_2$ where $f_2 < f_1$. The value of $f_2$ increases with the magnitude of the mutual coupling. Thus, the rate of rise of the output current $i_o$ depends on the amount of mutual coupling introduced by the second transformer $T_4$.

At some later time $t_2$, a second control signal pulse $i_2$, shown in the waveform D of FIG. 3, is introduced into the primary winding of the fourth transformer $T_b$ from a second signal source 36 triggering the second and fourth bipolar switches 39 and 50 to thereby short circuit the primary and secondary windings 42 and 46 of the second transformer $T_4$ and the associated capacitors $C_2$ and $C_4$. The mutual coupling between the tank circuit 30 and the output circuit 32 is eliminated, and the exchange of energy is inhibited. The energy in both the tank circuit 30 and the output circuit 32 gradually decays, the rate of decay depending upon the respective circuit losses. When the oscillation decays below a threshold value, as is well-known, all the SCR's will stop conducting. The tank circuit 30 can be recharged in preparation for generating another output pulse. The polarity of the output pulse may be reversed by reversing the order in which the first and second transformers $T_3$ and $T_4$ are short circuited.

The value of the compensating capacitors may be chosen such that the frequency of resonance of the tank circuit is the same before and after the triggering of the bipolar switches, or it may be chosen to effectuate a predetermined change in frequency. In the former case, the value of capacitors is chosen to resonate with the transformer self-inductance at the desired frequency of the output pulse. For example, for a tank circuit resonating at 100 kHz. and a total transfer of energy within two cycles of the 100 kHz. signal, a compensating capacitor having a value of 1.7 microfarads is employed to offset the transformer self-inductance of 6 microhenries.

Figure 4:
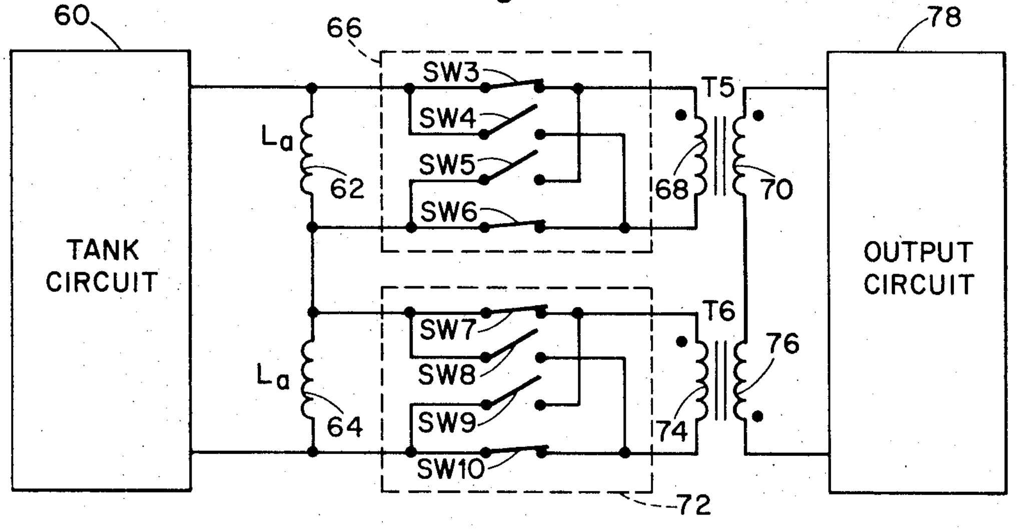
FIG. 4 is a schematic representation of a third embodiment of a variable mutual coupling circuit according to the present invention.

A third embodiment of a discrete variable mutual coupling circuit according to the present invention is shown schematically in FIG. 4 and employs an input tank circuit 60 including first and second inductors 62 and 64. Connected to the first inductor 62, via a first switching means 66, is a first transformer $T_5$ having primary and secondary windings 68 and 70, respectively. Connected to the second inductor 64 via a second switching means 72 is a second transformer $T_6$ having primary and secondary windings 74 and 76, respectively. The primary windings 68 and 74 are connected in a series aiding arrangement, and the secondary windings 70 and 76 are connected in a series opposing arrangement via the first and second switching means 66 and 72, respectively, to form an inductive balanced circuit.

The first switching means 66 includes first, second, third and fourth switching elements SW3—SW6. The first and fourth switching elements SW3 and SW6, in the closed position, connect the primary winding 68 of the transformer $T_5$ to the first inductor 62. With the second and third switching elements SW4 and SW5 in the closed position and the first and fourth switching elements SW3 and SW6 in the closed position, the primary winding 68 of the first transformer $T_5$ is also connected to inductor 62, however, the polarity is reversed.

In the quiescent state, the first and fourth switching elements SW3 and SW6 are in the closed position connecting the primary winding 68 of the first transformer $T_5$ in a series aiding configuration with the primary winding 74 of the second transformer $T_6$. The second and third elements SW4 and SW5 are in the open position. Since the two secondary windings are connected in a series opposing arrangement, an inductive balance configuration is achieved and no energy is transferred from the tank circuit 60 to the output circuit 78.

To transfer energy, the first and fourth switching elements SW3 and SW6 are opened and the second and third switching elements SW4 and SW5 are closed, reversing the connection of primary winding 68 of the first transformer $T_5$. This reversal causes an inductive unbalance resulting in a transfer of energy. In this embodiment, no transformer elements are removed from the circuit and, therefore, no compensation circuits are required to preclude detuning of the tank and output circuits 60 and 78. To reverse the polarity of the output signal, the switching elements SW7—SW10 of the second switching means 72 are activated in a manner similar to that described hereinabove.

Several embodiments of circuits have been shown and described herein in which the mutual coupling between a source and an output circuit have been changed in discrete steps to thereby transfer energy between the circuits.

We claim:

1. A variable mutual coupling circuit for transferring alternating current energy from an energy source to an output circuit comprising:
   - first transformer means having primary and secondary windings;
   - second transformer means having primary and secondary windings, the primary winding of said second transformer means being connected in a series aiding arrangement with the primary windings of said first transformer means, and the secondary winding of said first transformer means being connected in a series opposing arrangement with the secondary winding of said second transformer whereby an inductive balance configuration is achieved;
   - means for connecting the primary windings of said first and second transformers to said source of energy; and
   - first means connected to one of said transformer means for electrically bypassing one of the windings of said one of said transformer means to cause an inductive unbalance whereby energy flows from said energy source to said output circuit.

2. A variable mutual coupling circuit according to claim 1 including second means connected to the other of said transformer means for electrically bypassing said other transformer means to thereby inhibit the flow of energy from said source to said output circuit.

3. A variable mutual coupling circuit according to claim 2 wherein said first means includes a pair of parallel connected controlled rectifiers arranged in an opposite polarity configuration, said pair of controlled rectifiers being connected across the secondary winding of said first transformer means and being operable in response to a control signal to short circuit the secondary winding of said first transformer means.

4. A variable mutual coupling circuit for transferring alternating current energy from an energy source to an output circuit comprising:

a first transformer having primary and secondary windings;

second transformer having a primary winding connected in a series aiding arrangement with the primary winding of said first transformer and a secondary winding connected in a series opposing arrangement with the secondary winding of said first transformer to thereby form an inductive balance configuration;

four compensation networks, each connected to a different one of the primary and secondary windings of said first and second transformers and each having a reactance value equal to that of its corresponding transformer winding;

control signal source means being operative to generate control signals at predetermined times; and first, second, third and fourth bipolar switching means, said first and second switching means being connected in series and the series combination of said first and second switching means being connected to said energy source, said third and fourth switching means being connected in series and the series combination of said third and fourth switching means being connected to said output circuit, each of said first, second, third and fourth bipolar switching means also being connected in parallel with a particular transformer winding of said first and second transformers and its corresponding compensation network, each of said bipolar switching means being operable in response to a control signal from said control signal source means to short circuit its corresponding compensation network and transformer winding in a predetermined pattern to thereby transfer energy from said energy source to said output circuit.

5. A variable mutual coupling circuit according to claim 4 wherein each of said bipolar switching means includes a pair of parallel connected controlled rectifiers connected in an opposite polarity configuration so as to pass a bipolar signal in response to a control signal.

6. A variable mutual coupling circuit for transferring alternating current energy from an energy source to an output circuit comprising:

a first capacitor;

a first transformer having primary and secondary windings, one end of said primary winding being connected to one end of said first capacitor;

a first bipolar switch having one end connected to said energy source and to the other end of said first capacitor and the other end connected to the other end of the primary winding of said first transformer in series aiding arrangement, said first bipolar switch having a control element and being operable in response to a signal at its control element to close said first bipolar switch and thereby short circuit said first capacitor and the primary winding of said first transformer;

a second capacitor having one end connected to said source of energy;

a second transformer having primary and secondary windings, one end of said primary winding being connected to the other end of the primary winding of said first transformer in a series aiding arrangement, and the other end of the primary winding of said second transformer being connected to the other end of said second second capacitor, one end of the secondary winding of said second transformer being connected to one end of the secondary winding of said first transformer in a series opposing arrangement to thereby form an inductive balance configuration;

a second bipolar switch having one end connected to the common junction of the primary windings of said first and second transformers and the other end connected to said one end of said second capacitor, said second bipolar switch having a control element and being operable in response to a signal at its control element to close the switch and thereby short circuit said second capacitor and the primary winding of said second transformer;

a third capacitor having one end connected to said output circuit and the other end connected to the other end of the secondary winding of said first transformer;

a third bipolar switch having one end connected to the common junction of said secondary windings and the other end connected to said one end of said third capacitor, said third bipolar switch having a control element and being operable in response to a signal at its control element to short circuit said third capacitor and the secondary winding of said first transformer, whereby energy is transferred from said source of energy to said output circuit;

a fourth capacitor connected between the secondary winding of said second transformer and said output circuit; and a fourth bipolar switch having one end connected to the common junction of the said secondary windings and the other end connected to the common junction of said fourth capacitor and said output circuit, said fourth bipolar switch having a control element and being operable in response to a signal to close said bipolar switch whereby the energy transfer from said source to said output circuit is inhibited.

7. A variable mutual coupling circuit for transferring alternating current energy from an energy source to an output circuit comprising:

first transformer means having primary and secondary windings;

second transformer means having primary and secondary windings connected in an inductive balanced configuration with the primary and secondary windings of said first transformer means; and switching means connected between said output circuit and said energy source and having first and second conditions, said first condition connecting the primary winding of one of said transformer means in a series aiding arrangement with the primary winding of the other of said transformer means whereby an inductive balance is achieved and no energy flows from the source to said output circuit and said second condition reversing the polarity connection of the primary winding of said one transformer causing an inductive unbalance whereby energy flows from said source to said output circuit.